US008374290B2

(12) United States Patent
Futami et al.

(10) Patent No.: US 8,374,290 B2
(45) Date of Patent: Feb. 12, 2013

(54) DEMODULATING APPARATUS AND DEMODULATING METHOD

(75) Inventors: Tetsuhiro Futami, Kanagawa (JP); Yuichi Mizutani, Tokyo (JP)

(73) Assignee: Sony Corporation, Tokyo (JP)

(*) Notice: Subject to any disclaimer, the term of this patent is extended or adjusted under 35 U.S.C. 154(b) by 658 days.

(21) Appl. No.: 12/597,503

(22) PCT Filed: Apr. 25, 2008

(86) PCT No.: PCT/JP2008/058013
§ 371 (c)(1),
(2), (4) Date: Oct. 26, 2009

(87) PCT Pub. No.: WO2008/136376
PCT Pub. Date: Nov. 13, 2008

(65) Prior Publication Data
US 2010/0119014 A1 May 13, 2010

(30) Foreign Application Priority Data
Apr. 27, 2007 (JP) ................................ P2007 118940

(51) Int. Cl.
*H03D 1/00* (2006.01)
*H04L 27/06* (2006.01)
(52) U.S. Cl. ......... 375/343; 375/234; 375/322; 375/329
(58) Field of Classification Search .................. 375/235, 375/322, 329, 343
See application file for complete search history.

(56) References Cited

U.S. PATENT DOCUMENTS

| 5,398,260 | A * | 3/1995 | Min ............................ 375/286 |
| 6,226,333 | B1 * | 5/2001 | Spalink ...................... 375/340 |
| 7,580,689 | B2 * | 8/2009 | Watanabe et al. .......... 455/188.1 |
| 2002/0021721 | A1 * | 2/2002 | Jiang et al. .................... 370/910 |
| 2002/0196860 | A1 * | 12/2002 | Ohtaki .......................... 375/260 |
| 2003/0210646 | A1 * | 11/2003 | Ohseki et al. ................. 370/203 |
| 2004/0037366 | A1 * | 2/2004 | Crawford ...................... 375/295 |
| 2005/0025253 | A1 * | 2/2005 | Sakoda .......................... 375/260 |
| 2005/0143040 | A1 * | 6/2005 | Kerth et al. ................... 455/302 |

(Continued)

FOREIGN PATENT DOCUMENTS

| JP | 5 153087 | 6/1993 |
| JP | 5 160863 | 6/1993 |

(Continued)

OTHER PUBLICATIONS

Chen, H. et. al., "Adaptive I/Q Imbalance Compensation for RF Transceiver", 2004, Global Telecommunication Conference vol. 2, pp. 818-822.*

(Continued)

*Primary Examiner* — Kenneth Lam
*Assistant Examiner* — Sung Ahn
(74) *Attorney, Agent, or Firm* — Frommer Lawrence & Haug LLP; William S. Frommer

(57) ABSTRACT

This invention relates to a demodulating apparatus and a demodulating method for demodulating an input signal more quickly than before when the channels of the input signal are inverted.

A correlator 152 calculates a correlation value indicative of the correlation between a known delayed detection sequence made of symbols of correct delayed detection values of a known sequence inserted in the input signal and a received delayed detection sequence obtained through delay detection of the input signal. If the imaginary part of the correlation value is less than zero, a channel control section 132 switches the channels of the input signal before feeding the signal to a frame synchronization circuit 122. This invention can be applied illustratively to a satellite broadcast receiving apparatus.

6 Claims, 18 Drawing Sheets

U.S. PATENT DOCUMENTS

| | | | |
|---|---|---|---|
| 2006/0258309 A1* | 11/2006 | Watanabe et al. | 455/132 |
| 2007/0041474 A1* | 2/2007 | Gurney et al. | 375/332 |
| 2007/0183482 A1* | 8/2007 | Fujita et al. | 375/141 |
| 2007/0263666 A1* | 11/2007 | Yoshii et al. | 370/491 |

FOREIGN PATENT DOCUMENTS

| | | |
|---|---|---|
| JP | 9 247226 | 9/1997 |
| JP | 2002 9858 | 1/2002 |

* cited by examiner

CHANNELS NOT INVERTED

CHANNELS NOT INVERTED

CHANNELS INVERTED

CHANNELS INVERTED

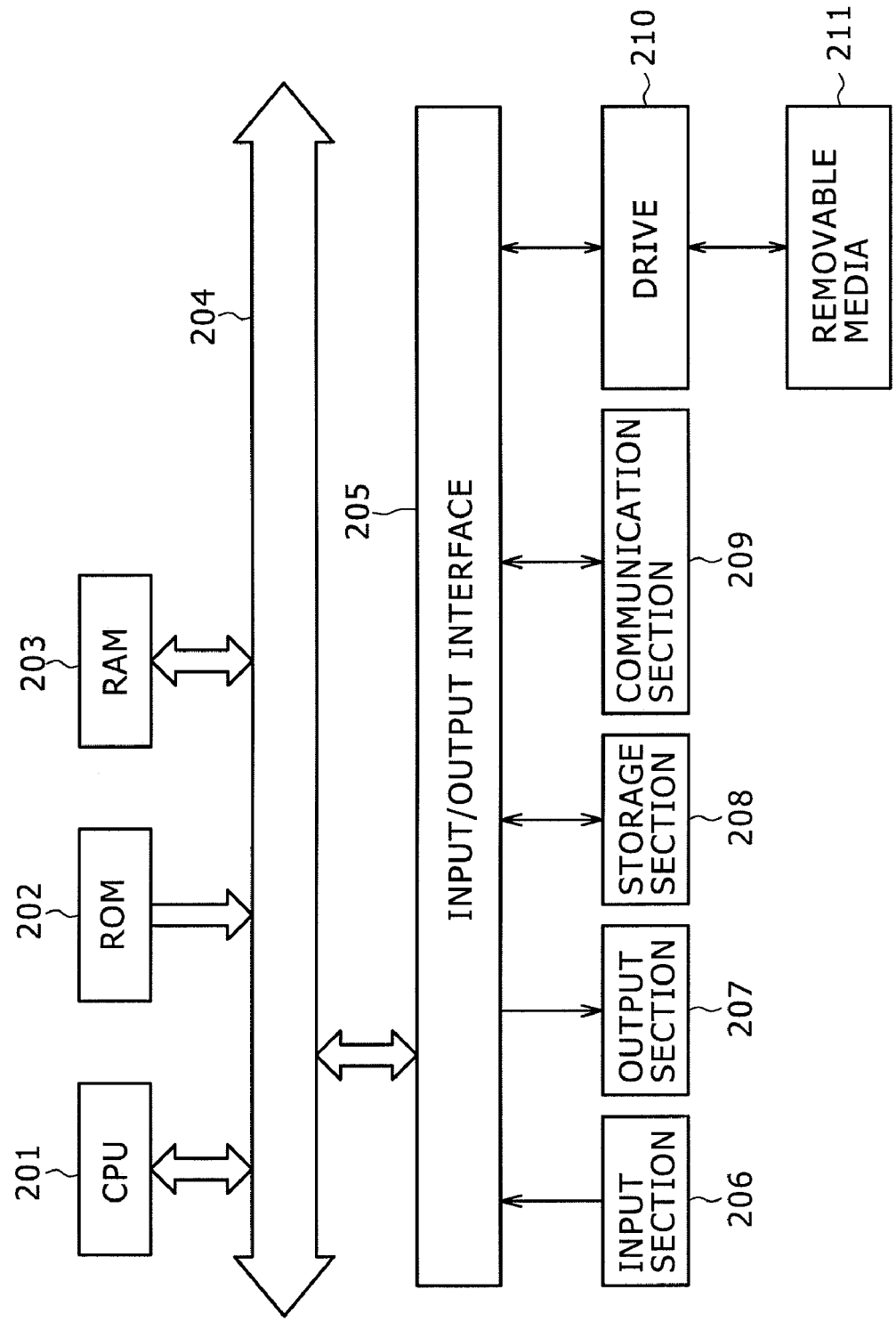

DEMODULATING APPARATUS AND DEMODULATING METHOD

TECHNICAL FIELD

The present invention relates to a demodulating apparatus and a demodulating method. More particularly, the invention relates to a demodulating apparatus and a demodulating method for demodulating an input signal that is split into two signals of the I-channel and Q-channel.

BACKGROUND ART

For a demodulating apparatus that demodulates a digitally modulated signal, the output channels of its tuner may or may not be connected with the input channels of downstream devices on a homopolar basis (i.e., between the same polarities) or between the same channels, illustratively in consideration of the ease of wiring between the tuner that receives the signal and the downstream devices such as A/D converters; there may well be cases where the connections are made between different polarities (i.e., on a heteropolar basis) or between different channels. In such cases, one or both of the I-channel (in-phase component) and Q-channel (orthogonal component) may be inverted in polarity, or the I-channel and Q-channel may be switched over when the input signal is admitted to the demodulating apparatus.

FIGS. 1 through 6 show patterns of connection between a tuner 11 and downstream A/D (Analog/Digital) converters 12-1 and 12-2, as well as the phase relationship between the I-channel and Q-channel of the input signal being admitted to a demodulating apparatus 13 in each connection pattern.

In the connection pattern of FIG. 1, the I-channel output terminals of the tuner 11 are connected to the A/D converter 12-1 on a homopolar basis; the Q-channel output terminals of the tuner 11 are connected to the A/D converter 12-2 on a homopolar basis; an I-channel signal having undergone A/D conversion is input to the I-channel input terminal of the demodulating apparatus 13 on a homopolar basis; and a Q-channel signal having undergone A/D conversion is input to the Q-channel input terminal of the demodulating apparatus 13 on a homopolar basis. Thus as shown on the right-hand side in FIG. 1, the I-channel signal is input to the demodulating apparatus 13 as the in-phase component and the Q-channel signal in input as the orthogonal component. That is, the I-channel and Q-channel of the input signal are input to the demodulating apparatus 13 in homopolar and in-phase fashion. In the description that follows, the connection pattern of FIG. 1 may be referred to as the basis pattern.

In the connection pattern of FIG. 2, the I-channel output terminals of the tuner 11 are connected to the A/D converter 12-2 on a homopolar basis; the Q-channel output terminals of the tuner 11 are connected to the A/D converter 12-1 on a homopolar basis; a Q-channel signal having undergone A/D conversion is input to the I-channel input terminal of the demodulating apparatus 13 on a homopolar basis; and an I-channel signal having undergone A/D conversion is input to the Q-channel input terminal of the demodulating apparatus 13 on a homopolar basis. Thus as shown on the right-hand side in FIG. 2, the I-channel signal is input to the demodulating apparatus 13 as the orthogonal component and the Q-channel signal is input as the in-phase component. That is, as compared with the basic pattern, the I-channel and Q-channel of the input signal are inverted in phase when input to the demodulating apparatus 13. In the description that follows, the inversion of the I-channel and Q-channel in phase may be referred to as the inversion of the I-channel and Q-channel or simply as the inversion of the channels.

In the connection pattern of FIG. 3, the I-channel output terminals of the tuner 11 are connected to the A/D converter 12-1 on a heteropolar basis; the Q-channel output terminals of the tuner 11 are connected to the A/D converter 12-2 on a homopolar basis; an I-channel signal having undergone A/D conversion is input to the I-channel input terminal of the demodulating apparatus 13 on a heteropolar basis; and a Q-channel signal having undergone A/D conversion is input to the Q-channel input terminal of the demodulating apparatus 13 on a homopolar basis. Thus as shown on the right-hand side in FIG. 3, the I-channel and Q-channel of the input signal are each offset by $+\pi/2$ radians when input to the demodulating apparatus 13, compared with the connection pattern of FIG. 2.

In the connection pattern of FIG. 4, the I-channel output terminals of the tuner 11 are connected to the A/D converter 12-1 on a homopolar basis; the Q-channel output terminals of the tuner 11 are connected to the A/D converter 12-2 on a heteropolar basis; an I-channel signal having undergone A/D conversion is input to the I-channel input terminal of the demodulating apparatus 13 on a homopolar basis; and a Q-channel signal having undergone A/D conversion is input to the Q-channel input terminal of the demodulating apparatus 13 on a heteropolar basis. Thus as shown on the right-hand side in FIG. 4, the I-channel and Q-channel of the input signal are each offset by $-\pi/2$ radians when input to the demodulating apparatus 13, compared with the connection pattern of FIG. 2.

In the connection pattern of FIG. 5, the I-channel output terminals of the tuner 11 are connected to the A/D converter 12-2 on a homopolar basis; the Q-channel output terminals of the tuner 11 are connected to the A/D converter 12-1 on a heteropolar basis; a Q-channel signal having undergone A/D conversion is input to the I-channel input terminal of the demodulating apparatus 13 on a heteropolar basis; and an I-channel signal having undergone A/D conversion is input to the Q-channel input terminal of the demodulating apparatus 13 on a homopolar basis. Thus as shown on the right-hand side in FIG. 5, the I-channel and Q-channel of the input signal are each offset by $-\pi/2$ radians when input to the demodulating apparatus 13, compared with the basic pattern.

In the connection pattern of FIG. 6, the I-channel output terminals of the tuner 11 are connected to the A/D converter 12-2 on a heteropolar basis; the Q-channel output terminals of the tuner 11 are connected to the A/D converter 12-1 on a homopolar basis; a Q-channel signal having undergone A/D conversion is input to the I-channel input terminal of the demodulating apparatus 13 on a homopolar basis; and an I-channel signal having undergone A/D conversion is input to the Q-channel input terminal of the demodulating apparatus 13 on a heteropolar basis. Thus as shown on the right-hand side in FIG. 6, the I-channel and Q-channel of the input signal are each offset by $+\pi/2$ radians when input to the demodulating apparatus 13, compared with the basic pattern.

In the connection patterns of FIGS. 5 and 6, there exist differences only in the amount of phase rotation in the input signal admitted to the demodulating apparatus 13 when compared with the basic pattern; the inversion of the channels does not occur. Thus the input signal can be correctly demodulated by suitably carrying out phase control.

In the connection patterns of FIGS. 2 through 4, on the other hand, the channels of the input signal admitted to the demodulating apparatus 13 are inverted, so that the input signal cannot be demodulated correctly through phase control alone.

Furthermore, the up-conversion or down-conversion performed upon transmission/reception may cause the inversion of one or both of the I-channel and Q-channel of the signals output from the tuner 11.

Conventionally, under these circumstances, the polarities of the I-channel and Q-channel of the signals output from the tuner 11 were detected beforehand and the wiring between the tuner 11 and the A/D converters 12-1 and 12-2 was determined accordingly, which prevented the inversion of the channels of the input signal admitted to the demodulating apparatus 13. Alternatively, the inversion of the channels of the input signal to the demodulating apparatus 13 was detected beforehand based on the polarities of the I-channel and Q-channel of the signals output from the tuner 11 as well as on the wiring between the tuner 11 and the A/D converters 12-1 and 12-2, and the external settings of the demodulating apparatus 13 were changed accordingly, which allowed the channels of the input signal to be switched.

However, there are numerous types of tuners and their characteristics are different from one type to another. Furthermore, there may be a plurality of common carriers between points of transmission and reception within a communication system, so that it can be difficult to detect the presence or absence of the inversion of the channels in polarity due to the up-conversion and down-conversion involved. In such cases, conventionally the user of the demodulating apparatus 13 may monitor the input signal from an upstream processing system and, while verifying the result of synchronism acquisition by the demodulating apparatus 13, may change the external settings of the demodulating apparatus 13 to switch the channels of the input signal as needed. This, however, can be a very troublesome procedure for the user.

In order to overcome that trouble, techniques have been proposed whereby one of the I-channel and Q-channel of the input signal is automatically inverted in polarity if the channel polarities of the input signal are found inverted (e.g., see Patent Document 1).

FIG. 7 shows an example in which the invention described in the above-cited Patent Document 1 is applied to the demodulating apparatus 13 indicated in FIGS. 1 through 6. The demodulating apparatus 13 in FIG. 7 is made up of a channel control circuit 41 that controls the channel polarities of the input signal, a frame synchronization circuit 42 that provides frame synchronization control of the input signal, a phase synchronization circuit 43 that performs phase synchronization control of the input signal, and an error correction and decoding circuit 44 that executes error correction and decoding of the input signal.

For example, error correction and decoding are carried out in the demodulation process notably under the DVB-S.2 standard, a standard transmission specification for satellite broadcasting. In the demodulating apparatus 13, the channel control circuit 41 monitors the status of frame synchronization during Viterbi decoding by the error correction and decoding circuit 44. If an asynchronous state is detected for a predetermined time period, the channel control circuit 41 adjusts the phases of the I-channel and Q-channel in units of $\pi/4$ or inverts the polarity of the I-channel alone. This makes it possible automatically to invert the I-channel of the input signal in polarity for correct demodulation even where the channels of the input signal are found inverted.

Patent Document 1: Japanese Patent Laid-Open No. Hei 5-160863

DISCLOSURE OF INVENTION

Technical Problem

However, the demodulating apparatus 13 of FIG. 7 controls the channel polarities of the input signal based on the synchronization status of the error correcting code circuit 44 at the last stage of the demodulation process, so that it takes time to perform demodulation correctly.

The present invention has been made in view of the above circumstances and provides arrangements which, if the channels of the input signals are found inverted, allow the input signal to be demodulated more quickly than before.

Technical Solution

According to a first aspect of the present invention, there is provided a demodulating apparatus for demodulating an input signal split into an I-channel signal and a Q-channel signal, the demodulating apparatus including: correlation detection means for calculating a correlation value between a known sequence made of symbols of known values inserted in said input signal, and a received sequence formed by the symbols obtained by detecting said input signal; and channel control means for switching the channels of said input signal if the correlation between said known sequence and said received sequence corresponding to said known sequence is found to be a negative correlation.

If frame synchronization of said input signal is not established within a predetermined time period after the channels of said input signal have been switched, then said channel control means may again switch the channels of said input signal.

The demodulating apparatus may further include confidence level determination means for determining the confidence level of said correlation value based on the magnitude of said correlation value; wherein, if the confidence level of said correlation value is not determined to be sufficient, then said channel control means may switch said channels on the basis of the result of decoding synchronization of said input signal.

Said known sequence may be modulated through $\pi/2$ shift BPSK (Binary Phase Shift Keying) when inserted into said input signal.

The demodulating apparatus may further include confidence level determination means for determining the confidence level of said correlation value based on the magnitude of a deflection angle of said correlation value; wherein, if the confidence level of said correlation value is not determined to be sufficient, then said channel control means may switch said channels on the basis of the result of decoding synchronization of said input signal.

According to one aspect of the present invention, there is provided a demodulating method for use with a demodulating apparatus for demodulating an input signal split into an I-channel signal and a Q-channel signal, the demodulating method including the steps of: calculating a correlation value between a known sequence made of symbols of known values inserted in said input signal and a received sequence formed by the symbols obtained by detecting said input signal; and switching the channels of said input signal if the correlation between said known sequence and said received sequence corresponding to said known sequence is found to be a negative correlation.

According to one aspect of the present invention, a correlation value between a known sequence made of symbols of known values inserted in the input signal and a received sequence formed by the symbols obtained by detecting the input signal is calculated. If the correlation between the known sequence and the received sequence corresponding to the known sequence is found to be a negative correlation, then the channels of the input signal are switched.

Advantageous Effects

According to one aspect of the present invention, the inversion of the channels of the input signal can be corrected. In particular, where the channels of the input signal are found inverted, the input signal can be demodulated more quickly than before according to one aspect of the present invention.

BRIEF DESCRIPTION OF DRAWINGS

FIG. 26 is a block diagram showing a typical structure of a personal computer.

EXPLANATION OF REFERENCE NUMERALS

111 Tuner, 112 A/D converter, 113 Demodulating apparatus, 121 Channel control circuit, 122 Frame synchronization circuit, 123 Phase synchronization circuit, 124 Error correction and decoding circuit, 131 Confidence level determination section, 132 Channel control section, 141 Correlation detection section, 142 Synchronization determination section, 151 Delayed detection value, 152 Correlator, 161 Peak detection circuit, 162 Synchronization determination circuit

BEST MODE FOR CARRYING OUT THE INVENTION

Some embodiments of the present invention will now be explained in reference to the accompanying drawings.

Figure 8:
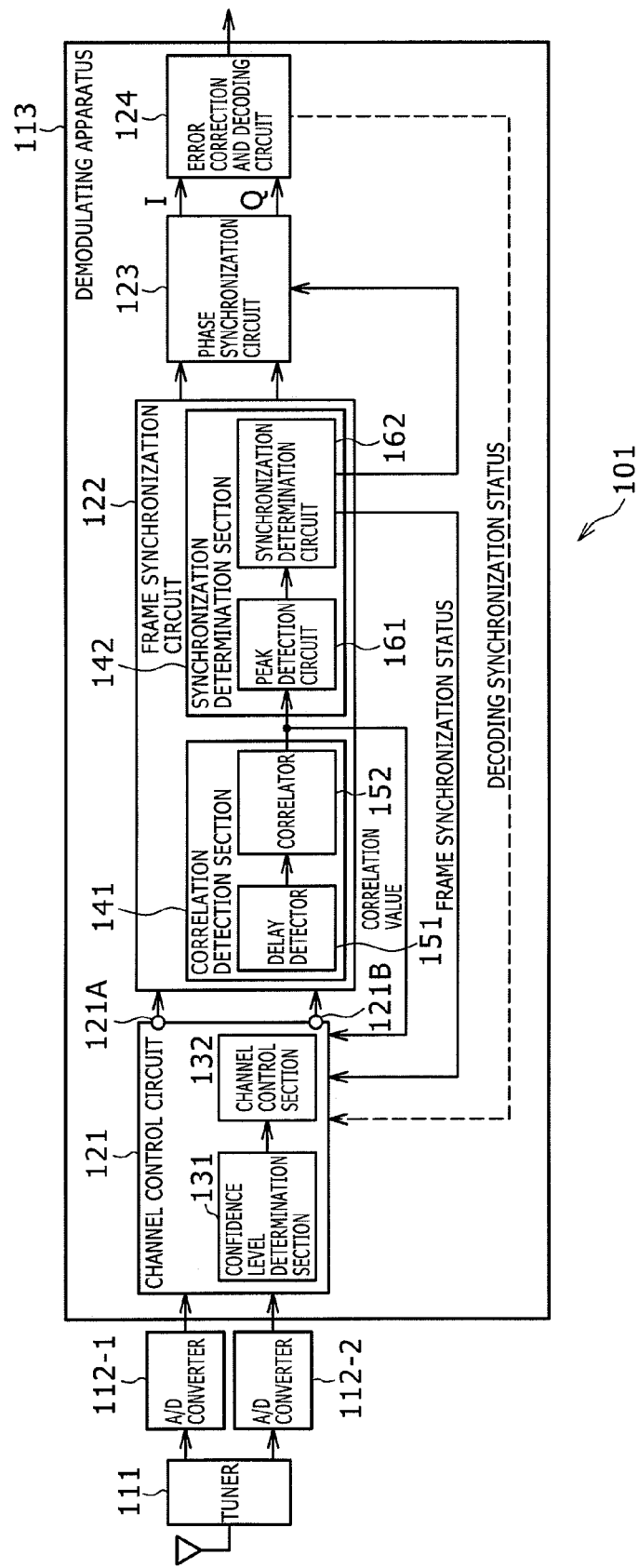
FIG. 8 is a block diagram showing a demodulating apparatus practiced as one embodiment of the present invention.

FIG. 8 is a block diagram showing a reception system to which the present invention is applied. A reception system 101 in FIG. 8 illustratively receives and demodulates broadcast signals (also called the input signal hereunder) that are in conformity with the DVB-S.2 standard.

The DVB-S.2 standard is a standard above the DVB-S standardized by the ETSI (European Telecommunications Standards Institute) for general use. Compared with the DVB-S standard, the DVB-S.2 seeks to improve the efficiency of frequency utilization and the C/N ratio (carrier to noise ratio) per frequency unit through the introduction of multiple phase shift keying and LDPC (Low Density Parity Check) code. Also, in order to ensure synchronization performance at low C/N ratios, the DVB-S.2 introduces a standardized PL (physical layer) header and synchronization pilot signal for transmitting information on the physical layer.

Figure 9:
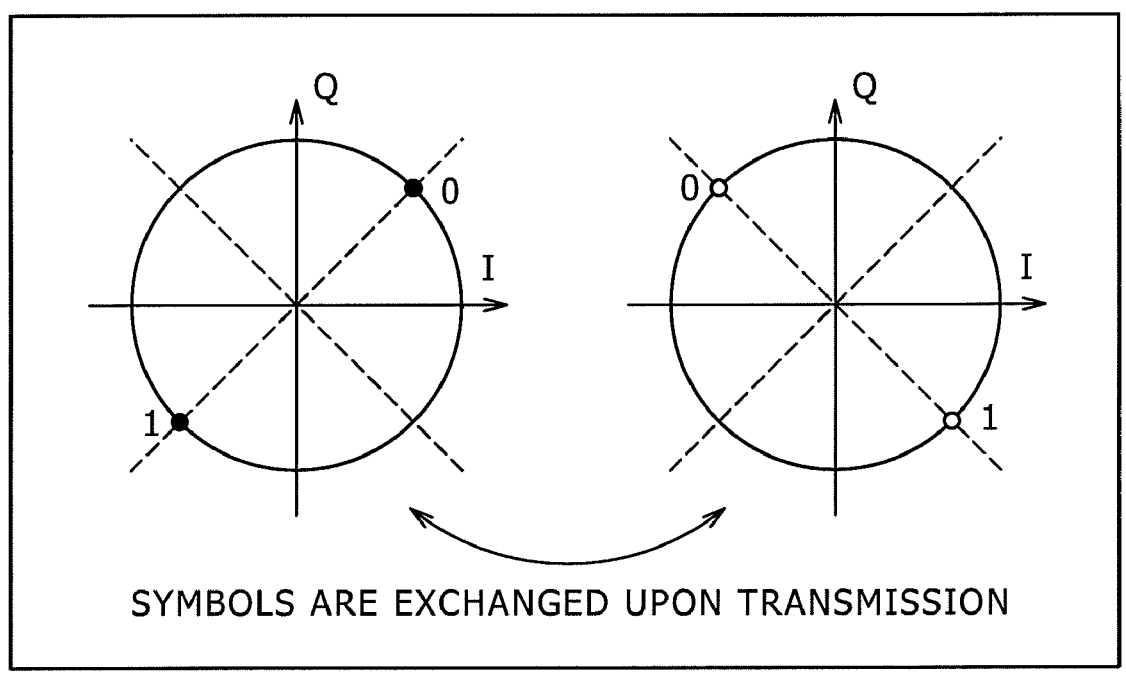
FIG. 9 is a view showing mapping patterns of symbols from $\pi/2$ shift BPSK on the complex plane.

According to the DVB-S.2 standard, the PL header and the synchronization pilot signal are modulated through $\pi/2$ shift BPSK (Binary Phase Shift Keying) when transmitted. FIG. 9 is a view showing mapping patterns of symbols from $\pi/2$ shift BPSK on the complex plane. A mapping pattern of an odd-numbered symbol is shown on the left-hand side of FIG. 9, and a mapping pattern of an even-numbered symbol is indicated on the right-hand side. That is, on the complex plane, the odd-numbered symbol is mapped in such a manner that its deflection angle is at $\pi/4$ when the value is zero and at $5\pi/4$ when the value is one; the even-numbered symbol is mapped so that its deflection angle is at $3\pi/4$ when the value is zero and at $7\pi/4$ when the value is one. As a result, the phase difference between the adjacent symbols is limited to $\pm\pi/2$.

Returning to FIG. 8, the reception system 101 is structured to include a tuner 111, A/D converters 112-1 and 112-2, and a demodulating apparatus 113.

The tuner 111 receives the input signal pursuant to the DVB-S.2 standard, splits the received input signal into two signals of the I-channel and Q-channel, and supplies the two signals to the A/D converters 112-1 and 112-2. In the ensuing description, the signal of the I-channel may be referred to as the I-channel signal and the signal of the Q-channel as the Q-channel signal.

The A/D converters 112-1 and 112-2 put the input I-channel signal or Q-channel signal to analog-to-digital conversion and supply the converted signal to a channel control circuit 121 in the demodulating apparatus 113. The channels and polarities of the signals input admitted to the A/D converters 112-1 and 112-2 are dependent illustratively on the connections between the tuner 111 and the A/D converters 112-1 and 112-2, as discussed above in reference to FIGS. 1 through 6.

The demodulating apparatus 113 is structured to include the channel control circuit 121, a frame synchronization circuit 122, a phase synchronization circuit 123, and an error correction and decoding circuit 124.

As will be described later notably in reference to FIG. 19, the channel control circuit 121 switches the channels of the input signal coming from the A/D converters 112-1 and 112-2 so that the I-channel and Q-channel of the signal to be output to the downstream frame synchronization circuit 122 through output terminals 121A and 121B will have a correct phase relationship therebetween, i.e., so that the phase of the Q-channel will be $\pi/2$ behind the phase of the I-channel, before feeding the signal to the frame synchronization circuit 122.

The channel control circuit 121 is structured to include a confidence level determination section 131 and a channel control section 132.

As will be described later notably in reference to FIG. 22, the confidence level determination section 131 determines the confidence level of the correlation value supplied from the correlator 152, and notifies the channel control section 132 of the result of the determination.

As will be described later notably in reference to FIG. 19, the channel control section 132 switches the channels of the input signal coming from the A/D converters 112-1 and 112-2 as needed based on the correlation value, on the result of the determination as to the confidence level of the correlation value, on frame synchronization status sent from a synchronization determination circuit 162, or on decoding synchronization status sent from the error correction and decoding circuit 124, before supplying the signal to the frame synchronization circuit 122.

Parenthetically, to switch the channels of the input signal means to invert the phase relationship between the signal to be output from the output terminal 121A on the one hand and the signal to be output from the output terminal 121B on the other hand. For example, the methods for switching the channels of the input signal may include using a selector or the like to switch the signals to be output from the output terminals 121A and 121B, and using an inverter or like equipment to invert the polarity of one of the signals to be output from the output terminals 121A and 121B in order to invert the phase relationship therebetween.

The frame synchronization circuit 122 performs synchronization control of the input signal in units of frames. Also, the frame synchronization circuit 122 feeds the phase synchronization circuit 123 with the input signal supplied unmodified from the channel control circuit 121. The frame synchronization circuit 122 is structured to include a correlation detection section 141 and a synchronization determination section 142. And the correlation detection section 141 is structured to include a delay detector 151 and a correlator 152. Furthermore, the synchronization determination section 142 is structured to include a peak detection circuit 161 and the synchronization determination circuit 162.

The delay detector 151 performs delayed detection of a sequence of complex symbols in the input signal (also called the received sequence hereunder) by doing a complex multiplication of the current symbol and the complex conjugate of the immediately preceding symbol, and outputs the value obtained from the delayed detection (the value will also be called the received delayed detection value hereunder) to the correlator 152.

As will be described later notably in reference to FIG. 10, the correlator 152 correlates a sequence of symbols of received delayed detection values (the sequence will also be called the received delayed detection sequence hereunder), with a sequence of symbols (also called a known delayed detection sequence hereunder) of correct delayed detection values (also called known delayed detection values hereunder) in a sequence of known values (also called a known sequence hereunder), such as parts of the PL header and the synchronization pilot signal, inserted periodically in the input signal, and supplies the correlation value obtained as a result of the correlation to the channel control circuit 121 and to the peak detection circuit 161 in the synchronization determination section 142.

In the ensuing description, it is assumed that the correlator 152 calculates the correlation value between a known delayed detection sequence corresponding to a known sequence of SOF (Start Of Frame) of the PL header inserted in the beginning of each header in the input signal on the one hand, and the received delayed detection sequence on the other hand.

The peak detection circuit 161 detects the peak of the correlation value appearing at intervals of frames and the timing of the peak (also called the peak timing hereunder), and supplies the synchronization determination circuit 162 with a signal indicative of the peak value and peak timing thus detected.

The synchronization determination circuit 162 acquires frame-by-frame synchronization of the input signal based on the peak value and peak timing of the correlation value detected by the peak detection circuit 161. The synchronization determination circuit 162 supplies the channel control circuit 121 with a signal indicative of frame synchronization status and the peak timing of the correlation value. Also, the synchronization determination circuit 162 supplies the phase synchronization circuit 123 with a signal indicative of frame synchronization status and the start position of each frame in the input signal, among others.

The phase synchronization circuit 123 corrects the phase error of each symbol in the input signal before supplying the signal to the error correction and decoding circuit 124.

The error correction and decoding circuit 124 performs LDPC and BCH decoding, or an error correction process (FEC (Forward Error Correction)) such as Viterbi decoding and Reed-Solomon decoding on the input signal, and the resulting TS (transport stream) packets to downstream devices. Also, the error correction and decoding circuit 124 supplies the channel control circuit 121 with a signal indicative of decoding synchronization status resulting from the error correction and decoding process.

It is also possible to have the A/D converters 112-1 and 112-2 included in the demodulating apparatus 113.

Figure 10:
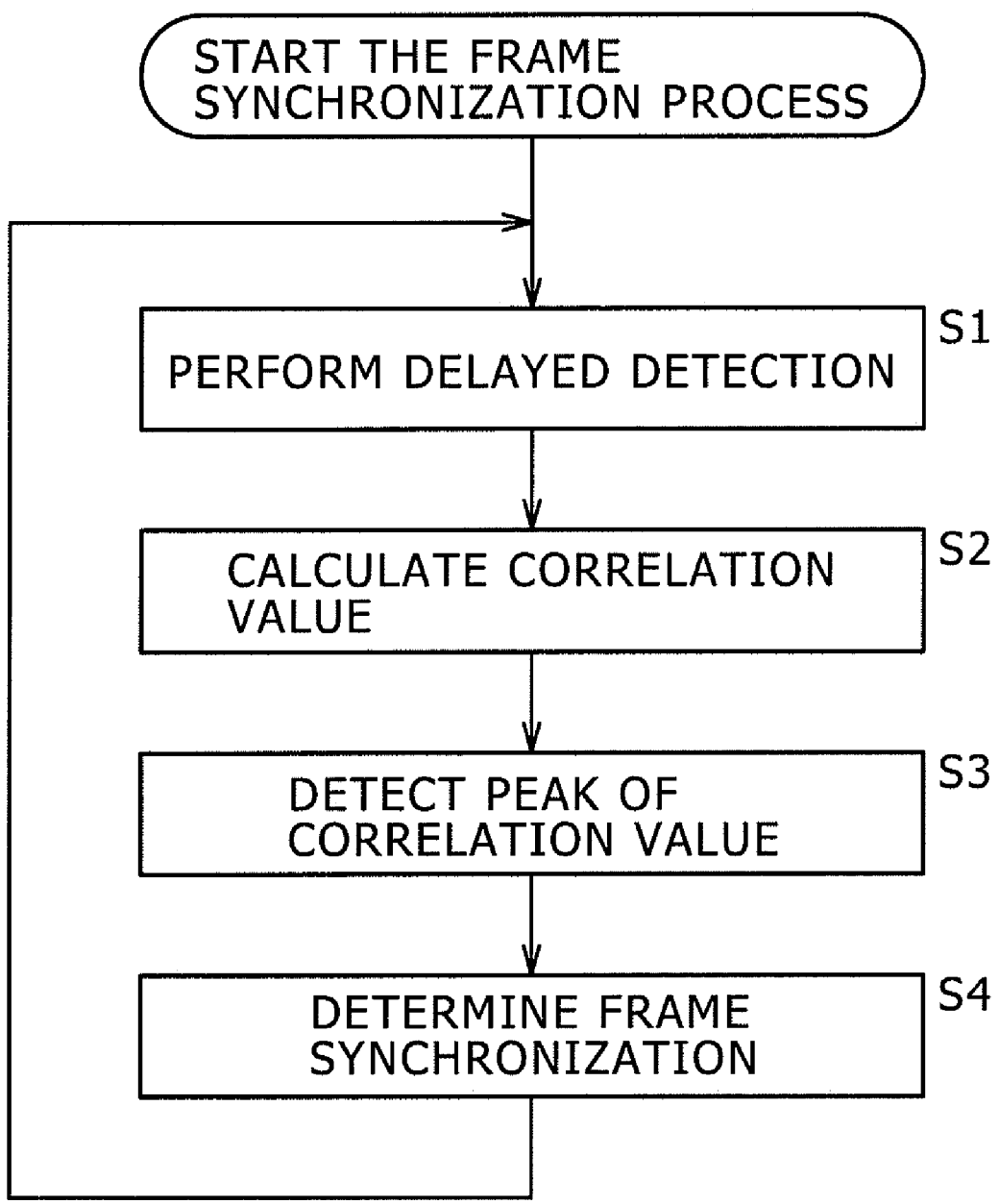
FIG. 10 is a flowchart explanatory of a frame synchronization process performed by the demodulating apparatus of FIG. 8.

Explained below in reference to FIG. 10 is the frame synchronization process performed by the frame synchronization circuit 122.

In step S1, the delay detector 151 performs delayed detection. Specifically, the delay detector 151 carries out delayed detection of the input signal by doing a complex multiplication of the current symbol and the complex conjugate of the immediately preceding symbol, and outputs the value obtained from the delayed detection to the correlator 152.

In step S2, the correlator 152 calculates the correlation value. Specifically, the correlator 152 calculates the correlation value representative of the correlation between the received delayed detection sequence and a known delayed detection sequence using the following expression (1):

[Expression 1]

$$\text{Correlation value} = \sum_{i=1}^{K} a_i \cdot d_i \quad (1)$$

$$a_i = \begin{cases} 1 : \text{if the } i\text{-th value in the known} \\ \quad \text{delayed detection sequence is } j \\ -1 : \text{if the } i\text{-th value in the known} \\ \quad \text{delayed detection sequence is } -j \end{cases}$$

The value K in the expression (1) is obtained by subtracting one from the number of symbols in the known sequence inserted in the beginning of each frame in the input signal. And the value $d_i$ denotes the i-th value in the received delayed detection sequence input to the correlator 152.

The correlator 152 supplies the calculated correlation value to the channel control circuit 121 and peak detection circuit 161.

Meanwhile, consider the differences between two cases, i.e., between the case in which the channels of the input signal are not inverted on the one hand and the case in which the channels of the input signals are inverted on the other hand.

First, consider the case where the channels of the input signal are not inverted. For purpose of simplification and illustration, suppose that the value of a known sequence inserted in the input signal is 0011. In this case, the value of the known delayed detection sequence corresponding to the known sequence is j, j, j.

Figure 11:
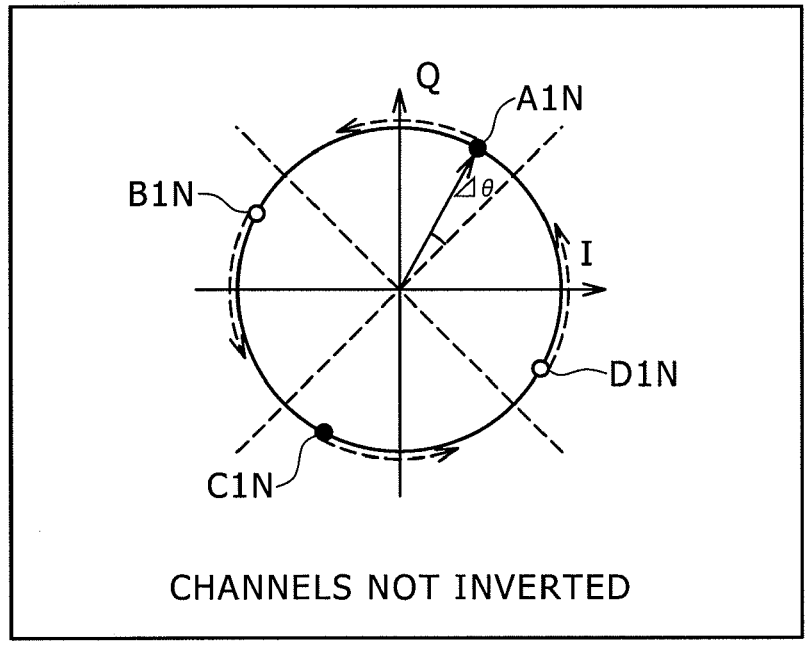
FIG. 11 is a view showing received points on the complex plane in effect upon receipt of a known sequence inserted in the input signal with the channels of the input signal not inverted.

FIG. 11 is a view showing received points on the complex plane in effect upon receipt of a known sequence inserted in the input signal with the channels of the input signal not inverted. If it is assumed that A1 stands for a first symbol, B1 for a second symbol, C1 for a third symbol, and D1 for a fourth symbol of the known sequence, then the received points on the complex plane in the received sequence corresponding to the symbols A1, B1, C1 and D1 are given as follows:

Point A1N(cos(π/4+Δθ), jsin(π/4+Δθ))
Point B1N(−sin(π/4+2Δθ), jcos(π/4+2Δθ))
Point C1N(−cos(π/4+3Δθ), −jsin(π/4+3Δθ))
Point D1N(sin(π/4+4Δθ), −jcos(π/4+4Δθ))

where, Δθ denotes the phase rotation angle per symbol caused by frequency error.

Figure 12:
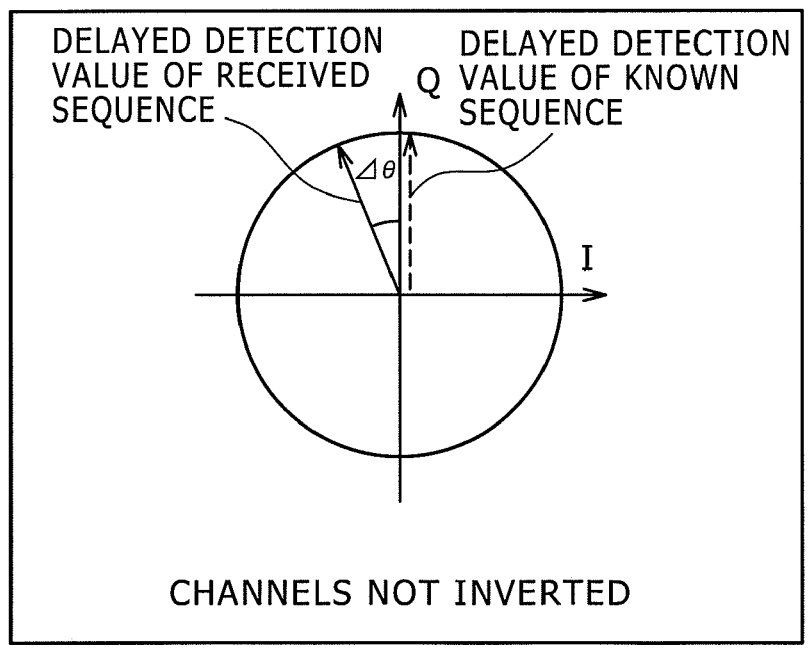
FIG. 12 is a view showing the relationship between a received delayed detection value and a known delayed detection value in a received sequence corresponding to a known sequence with the channels of the input signal not inverted.

In the case above, the delayed detection value between adjacent symbols in the received sequence corresponding to the known sequence (i.e., received delayed detection value) is given as B1N·A1N*=C1N·B1N*=D1N·C1N*=$e^{j(\pi/2+\Delta\theta)}$. As shown in FIG. 12, the phase is rotated by +Δθ relative to the delayed detection value of the known sequence (i.e., known delayed detection value). And the correlation value between the known delayed detection sequence and the received delayed detection sequence corresponding to the known sequence, i.e., correlation value at peak timing, is defined by the following expression (2) based on the above-indicated expression (1):

$$\text{Correlation value} = e^{j(\pi/2+\Delta\theta)} + e^{j(\pi/2+\Delta\theta)} + e^{j(\pi/2+\Delta\theta)} \quad (2)$$
$$= 3e^{j(\pi/2+\Delta\theta)}$$
$$= 3(\cos(\pi/2 + \Delta\theta) + j\sin(\pi/2 + \Delta\theta))$$

Figure 13:
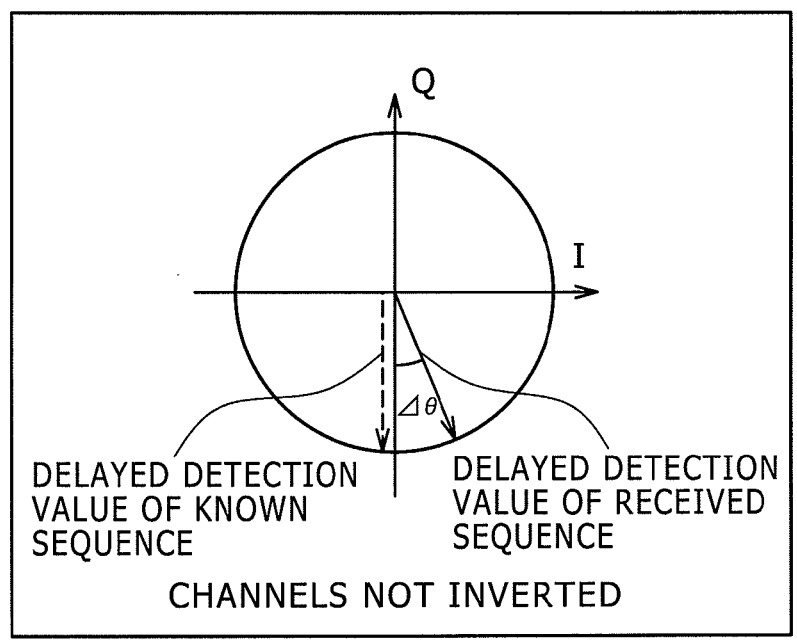
FIG. 13 is another view showing the relationship between a received delayed detection value and a known delayed detection value in a received sequence corresponding to a known sequence with the channels of the input signal not inverted.

As described, where the channels of the input signal are not inverted, the received delayed detection value corresponding to the known sequence and the known delayed detection value come closer to the same phase (i.e., positive correlation getting higher) the smaller the value Δθ becomes, as shown in FIGS. 12 and 13.

Figure 14:
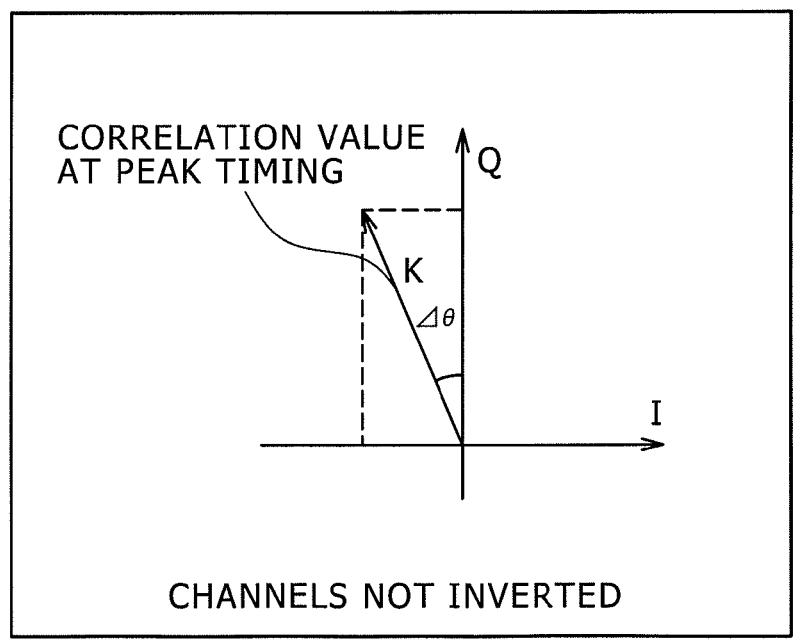
FIG. 14 is a view showing the phase of the correction value at a peak timing with the channels of the input signal not inverted.

Also, in an ideal reception environment, the correlation value at peak timing is given as $Ke^{j(\pi/2+\Delta\theta)}$ (where K is obtained by subtracting one from the number of symbols of the known sequence, as in the expression (1) above). As shown in FIG. 14, the correlation value may be expressed at an angle of +Δθ relative to the positive direction of the Q-axis.

Figure 15:
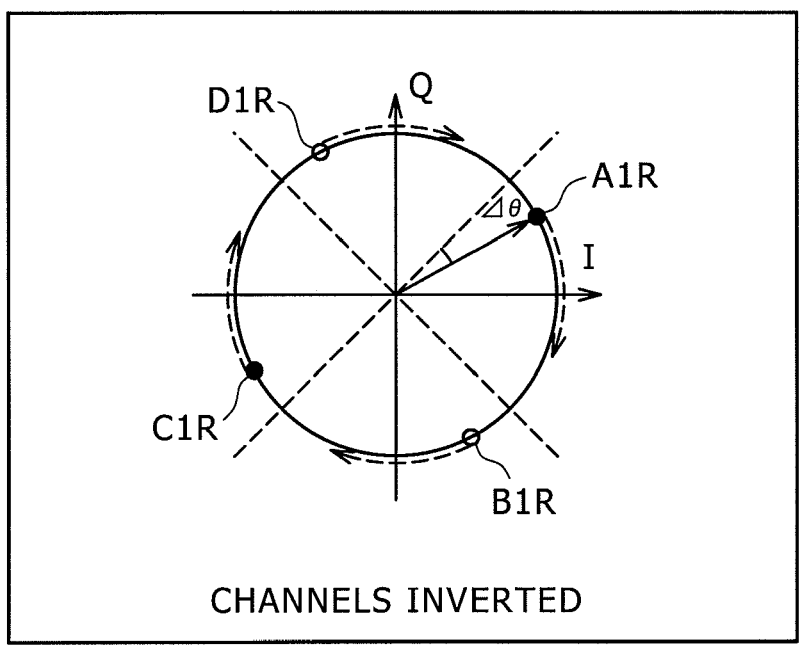
FIG. 15 is a view showing received points on the complex plane in effect upon receipt of a known sequence inserted in the input signal with the channels of the input signal inverted.

Next, consider the case where the channels of the input signal are inverted.

Where the channels of the input signal are inverted, the rotating direction of the phase rotation angle per symbol caused by frequency error is reversed compared with the case where the channels of the input signal are not inverted. Thus, as shown in FIG. 15, the received points on the complex plane in effect upon receipt of the sequence of symbols A1, B1, C1 and D1 in the above-described known sequence of "0011" are given as follows:

Point A1R(cos(π/4−Δθ), jsin(π/4−Δθ))
Point B1R(sin(π/4−2Δθ), −jcos(π/4−2Δθ))
Point C1R(−cos(π/4−3Δθ), −jsin(π/4−3Δθ))
Point D1R(−sin(π/4−4Δθ), jcos(π/4−4Δθ))

Figure 16:
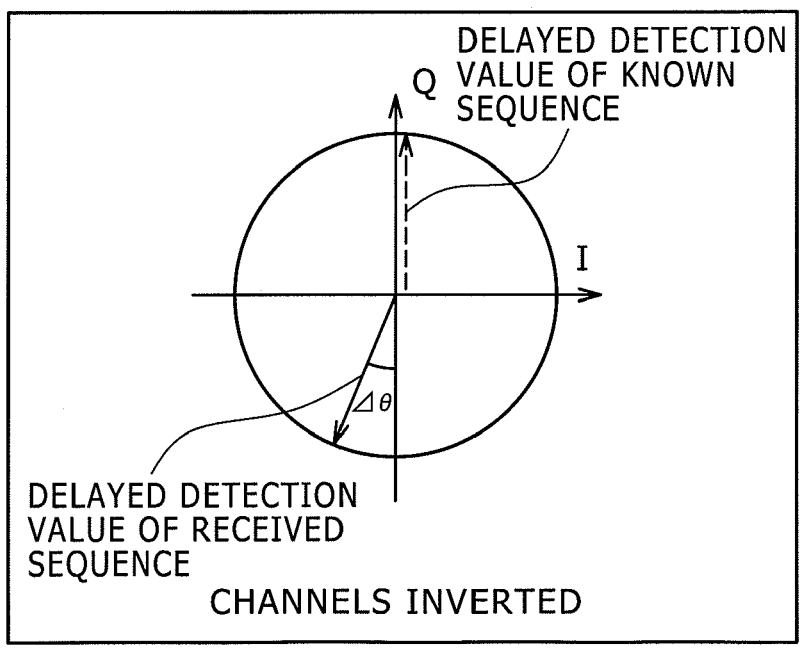
FIG. 16 is a view showing the relationship between a received delayed detection value and a known delayed detection value in a received sequence corresponding to a known sequence with the channels of the input signal inverted.

In the case above, the received delayed detection value of the received sequence corresponding to the known sequence is given as B1R·A1R*=C1R·B1R*=D1R·C1R*=$e^{j(-\pi/2-\Delta\theta)}$. As shown in FIG. 16, the phase is rotated by π−Δθ relative to the known delayed detection value of the known sequence. And the correlation value between the known delayed detection sequence and the received delayed detection sequence corresponding to the known sequence is defined by the following expression (3) based on the above-indicated expression (1):

$$\text{Correlation value} = e^{j(-\pi/2-\Delta\theta)} + e^{j(-\pi/2-\Delta\theta)} + e^{j(-\pi/2-\Delta\theta)} \quad (3)$$
$$= 3e^{j(-\pi/2-\Delta\theta)}$$
$$= 3(\cos(-\pi/2 - \Delta\theta) + j\sin(-\pi/2 - \Delta\theta))$$

Figure 17:
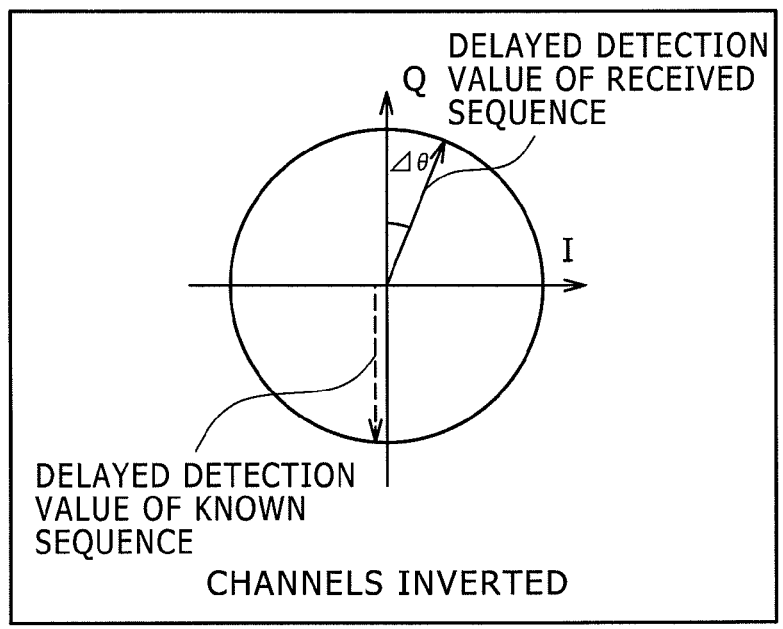
FIG. 17 is another view showing the relationship between a received delayed detection value and a known delayed detection value in a received sequence corresponding to a known sequence with the channels of the input signal inverted.

As described, where the channels of the input signal are inverted, the known delayed detection value and the received delayed detection value corresponding to the known sequence come closer to the opposite phase (i.e., negative correlation getting higher) the smaller the value Δθ becomes, as shown in FIGS. 16 and 17.

Also, in an ideal reception environment, the correlation value at peak timing is given as $Ke^{j(-\pi/2-\Delta\theta)}$. As shown in FIG.

18, the correlation value may be expressed at an angle of −Δθ relative to the negative direction of the Q-axis.

In step S3 back in FIG. 10, the peak detection circuit 161 detects a peak of the correlation value. Specifically, the peak detection circuit 161 detects the peak value of the correlation value appearing at intervals of frames and the peak timing, and supplies the synchronization determination circuit 162 with a signal indicative of the peak value and peak timing thus detected.

In step S4, the synchronization determination circuit 162 determines frame synchronization. Illustratively, if a peak value of the correlation value higher than a predetermined threshold value appears continuously over a predetermined time period, the synchronization determination circuit 162 determines that frame synchronization has been established. The synchronization determination circuit 162 then supplies the channel control circuit 121 and phase synchronization circuit 123 with a signal indicative of frame synchronization status, i.e., of whether or not frame synchronization is established. And if frame synchronization is found to be established, the synchronization determination circuit 162 supplies the phase synchronization circuit 123 with a signal indicative of the start position of each of the frames in the input signal. Furthermore, the synchronization determination circuit 162 supplies the channel control circuit 121 with a signal indicative of the peak timing of the correlation value.

Thereafter, control is returned to step S1 and steps S1 through S4 are repeatedly executed.

Figure 19:
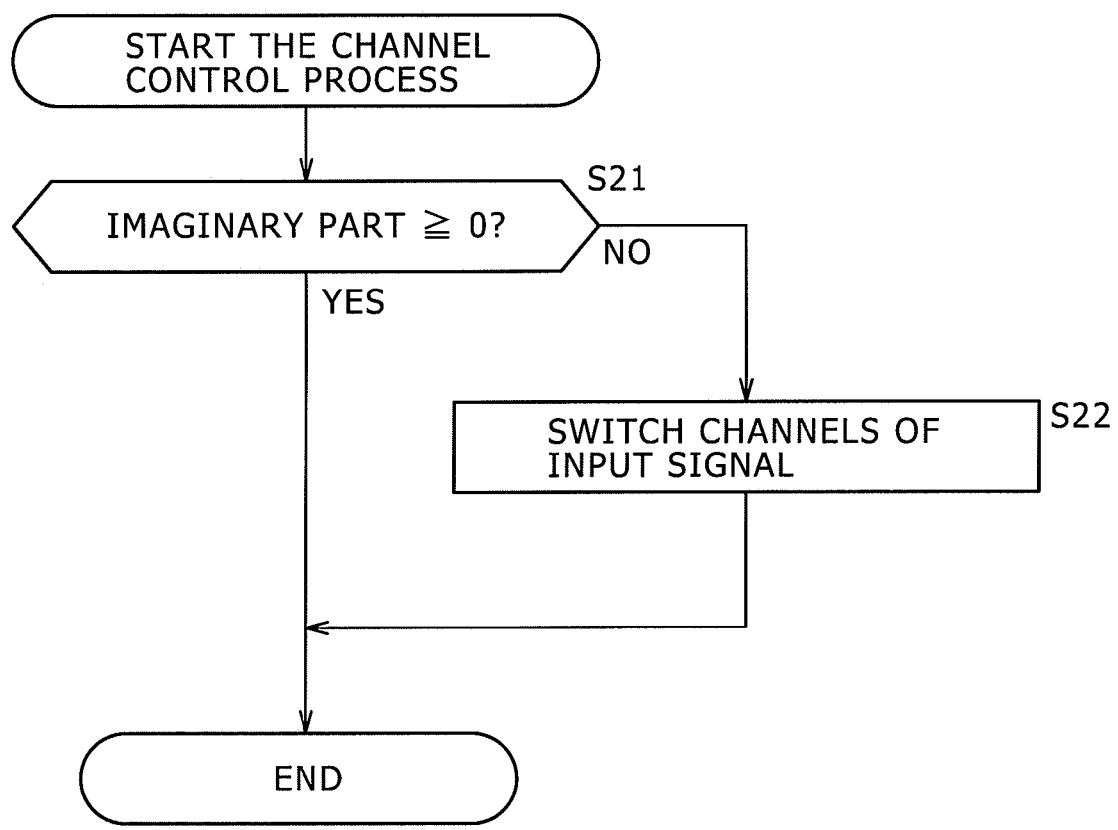
FIG. 19 is a flowchart explanatory of a first embodiment of a channel control process executed in relation to the frame synchronization process of FIG. 10.

Explained below in reference to the flowchart of FIG. 19 is how the first embodiment of the channel control process is executed by the channel control circuit 121 in relation to the frame synchronization process of FIG. 10.

Figure 18:
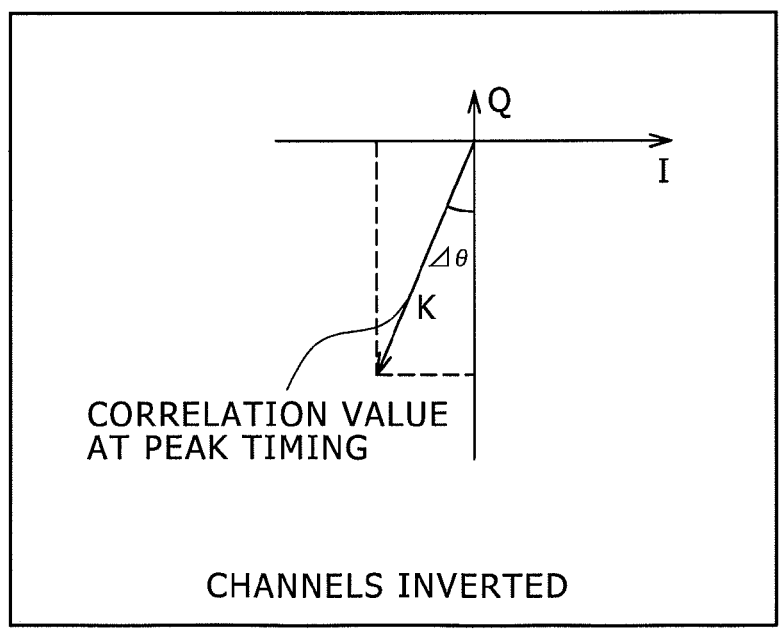
FIG. 18 is a view showing the phase of the correction value at a peak timing with the channels of the input signal inverted.
Figure 20:
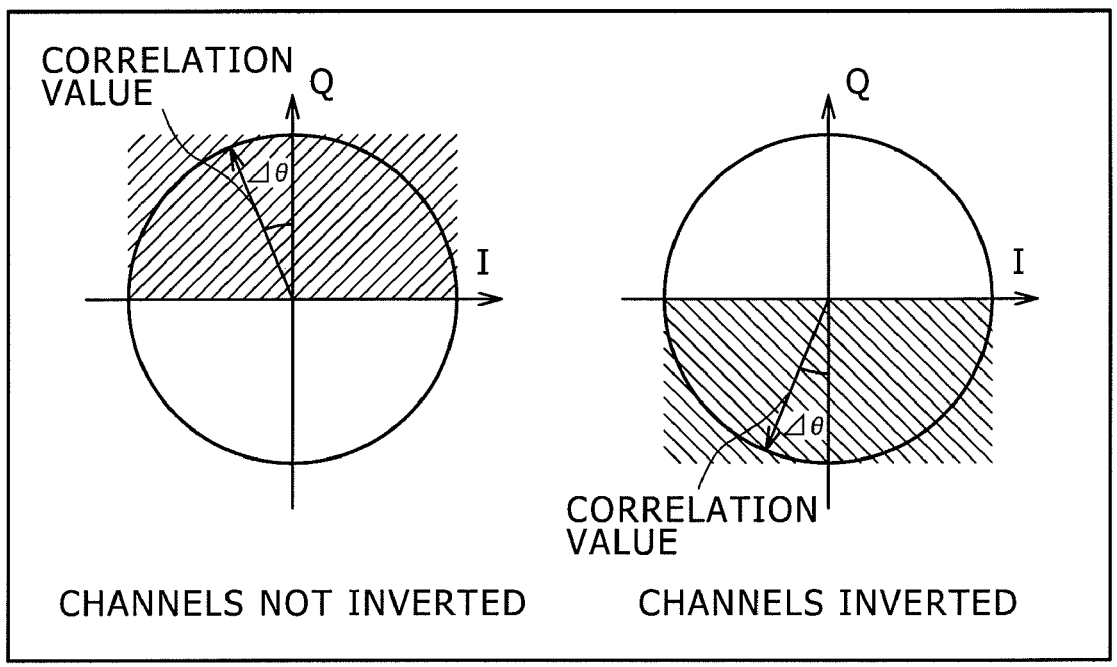
FIG. 20 is a view explanatory of a determination process in step S21 of FIG. 19.

In step S21, the channel control section 132 determines whether or not the imaginary part of the correlation value is equal to or higher than zero. As discussed above in reference to FIG. 14, in an ideal reception environment where the channels of the input signal are not inverted, the correlation value at peak timing is given as $Ke^{j(\pi/2+\Delta\theta)}$. On the other hand, as described above in reference to FIG. 18, in an ideal reception environment where the channels of the input signal are inverted, the correlation value at peak timing is given as $Ke^{j(-\pi/2-\Delta\theta)}$. Accordingly, where the channels of the input signal are not inverted and where the angle Δθ falls within the range of ±π/2, the imaginary part of the relative value takes a positive value at peak timing, and the correlation between the known delayed detection sequence and the received delayed detection sequence corresponding to the known sequence becomes a positive correlation, as shown shaded in the left-hand view of FIG. 20. Meanwhile, if the channels of the input signal are inverted and if the angle Δθ falls within the range of ±π/2, the imaginary part of the relative value takes a negative value at peak timing, and the correlation between the known delayed detection sequence and the received delayed detection sequence corresponding to the known sequence becomes a negative correlation, as shown shaded in the right-hand view of FIG. 20.

Taking advantage of the above-described characteristic, the channel control section 132 determines that the channels of the input signal are inverted if the imaginary part of the correlation value at peak timing is less than zero and if the angle Δθ falls within the range of ±π/2. Control is then passed on to step S22.

In step S22, the channel control section 132 switches the channels of the input signal, thereby terminating the channel control process. The input signal with its channel thus switched is subjected to a downstream demodulation process.

If in step S21 the imaginary part of the correlation value at peak timing is found to be equal to or higher than zero and if the angle Δθ falls within the range of ±π/2, the channel control section 132 determines that the channels of the input signal are not inverted. The channel control section 132 then terminates the channel control process without switching the channels of the input signal. The input signal is put successively to the downstream demodulation process.

Figure 1:
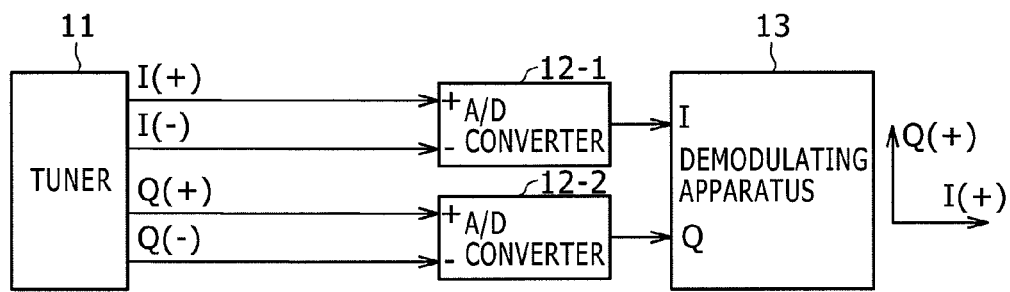
FIG. 1 is a view showing a first connection pattern between a tuner and A/D converters.
Figure 2:
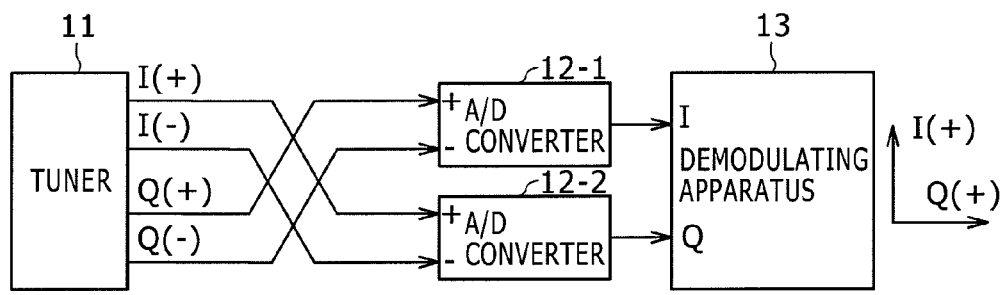
FIG. 2 is a view showing a second connection pattern between the tuner and the A/D converters.
Figure 3:
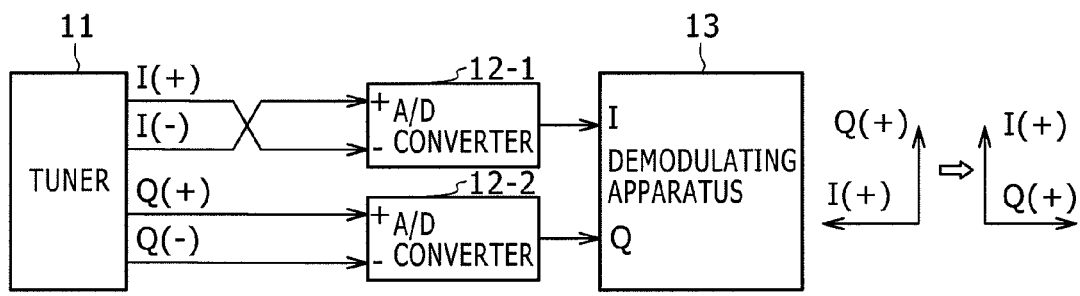
FIG. 3 is a view showing a third connection pattern between the tuner and the A/D converters.
Figure 4:
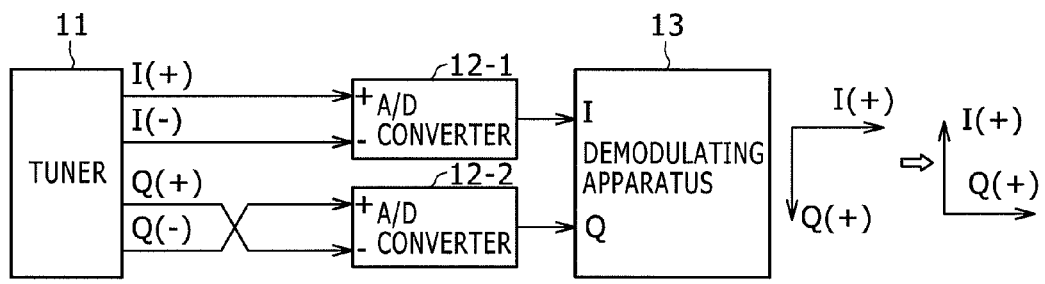
FIG. 4 is a view showing a fourth connection pattern between the tuner and the A/D converters.
Figure 5:
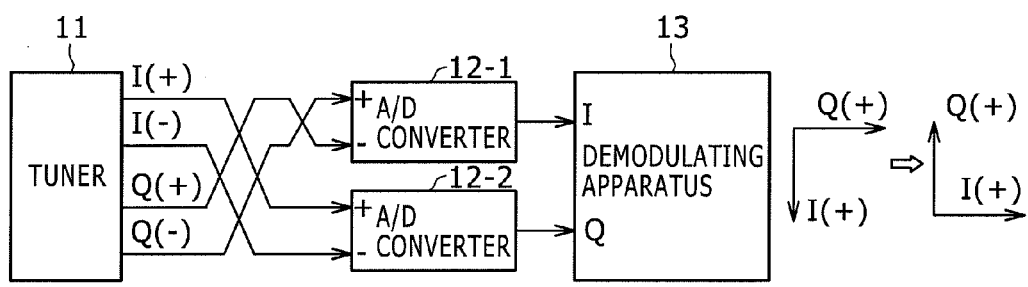
FIG. 5 is a view showing a fifth connection pattern between the tuner and the A/D converters.
Figure 6:
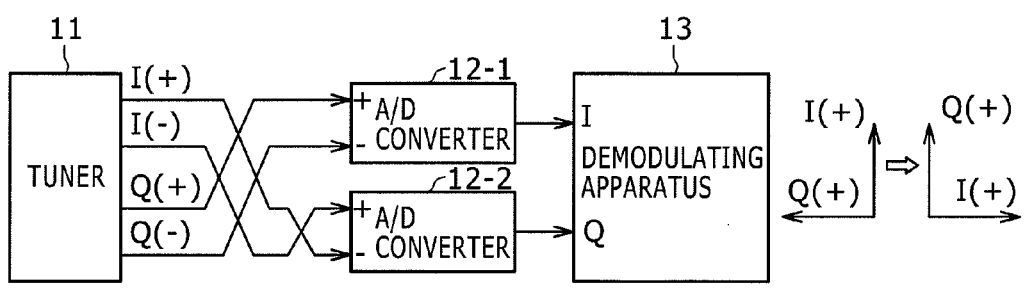
FIG. 6 is a view showing a sixth connection pattern between the tuner and the A/D converters.
Figure 7:
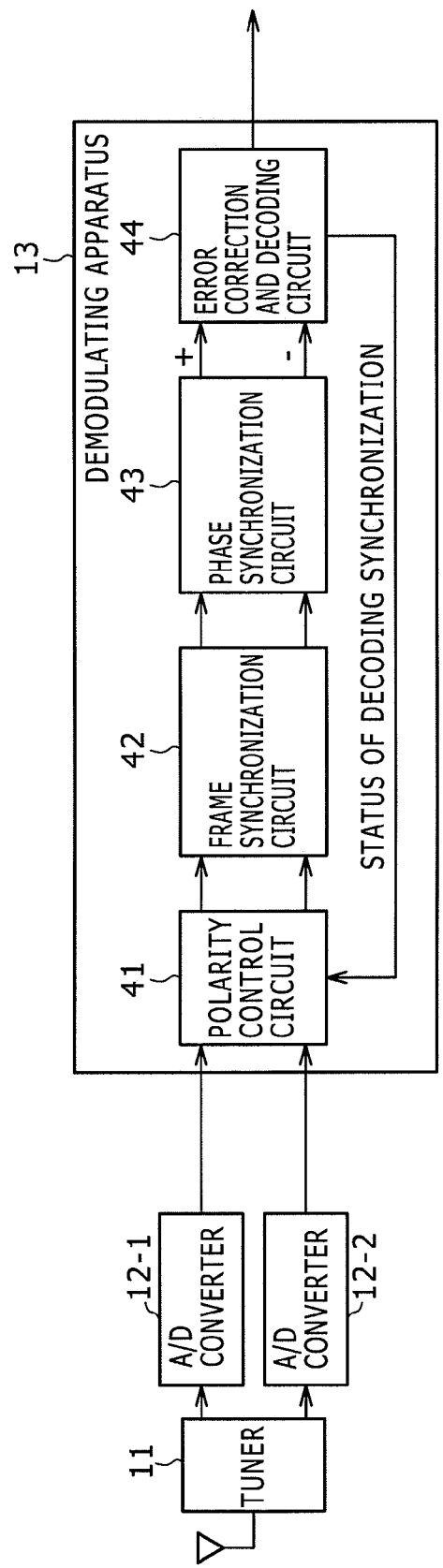
FIG. 7 is a block diagram showing a typical structure of a conventional demodulating apparatus.

As described, if the channels of the input signal are found inverted, it is possible to control the switching of the channels of the input signal correctly and more quickly than before, i.e., unlike the demodulating apparatus 13 of FIG. 7 waiting for the result of the decoding synchronization in the error correction process before a channel switchover, on the basis of the correlation value calculated halfway through the frame synchronization.

Also, there is no need to determine beforehand whether the polarity of each channel is inverted following up-conversion and down-conversion between points of data exchange and to arrange the connections between the tuner 111 and the A/D converters 112-1 and 112-2 so as not to invert the channels of the input signal. The channels of the input signal, if found inverted, can be corrected automatically so as to let the unmodulated original data be restored always correctly and more quickly than before.

Furthermore, it is possible to determine whether or not the imaginary part of the correlation value is equal to or higher than zero, illustratively by verifying whether the most significant bit of the correlation value is zero or one. For this reason, the determination process above can be implemented using a simplified circuit structure conducive to making the size of circuitry smaller than before.

Figure 21:
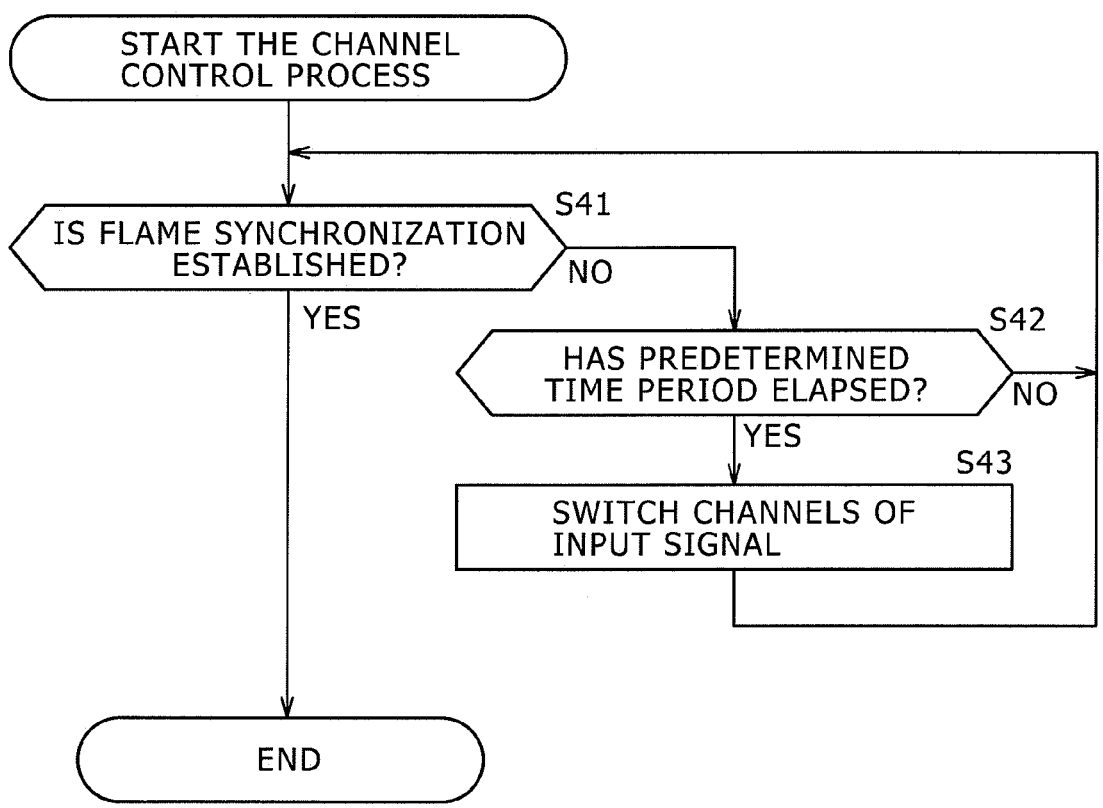
FIG. 21 is a flowchart explanatory of a second embodiment of the channel control process executed in relation to the frame synchronization process of FIG. 10.

Explained below in reference to the flowchart of FIG. 21 is how the second embodiment of the channel control process is executed by the channel control circuit 121 in relation to the frame synchronization process of FIG. 10.

In step S41, the channel control section 132 determines whether frame synchronization has been established on the basis of the signal coming from the synchronization determination circuit 162. If frame synchronization is not found to have been established, control is passed on to step S42.

In step S42, the channel control section 132 determines whether a predetermined time period has elapsed. If the predetermined time period is not found to have elapsed, i.e., if the state of frame asynchronism is not found to have lasted for the predetermined time period, control is returned to step S41. Steps S41 and S42 are repeatedly executed until frame synchronization is found to have been established in step S41, or until the predetermined time period is found to have elapsed in step S42.

If in step S42 the predetermined time period is found to have elapsed, i.e., if the state of frame asynchronism has lasted for the predetermined time period, control is passed on to step S43.

In step S43, as in the above-described step S22 of FIG. 19, the channels of the input signal are switched. Thereafter, control is returned to step S41, and steps S41 through S43 are repeatedly executed until frame synchronization is determined to be established in step S41. That is, the channels of the input signal are switched at predetermined intervals until frame synchronization is established.

If in step S41 frame synchronization is determined to be established, the channel control process is terminated.

As described, if the channels of the input signal are found inverted, it is possible to control the switching of the channels of the input signal correctly and more quickly than before, i.e., unlike the demodulating apparatus 13 of FIG. 7 waiting for the result of the decoding synchronization in the error correction process before a channel switchover, on the basis of the result of the frame synchronization upstream of the decoding synchronization.

Figure 22:
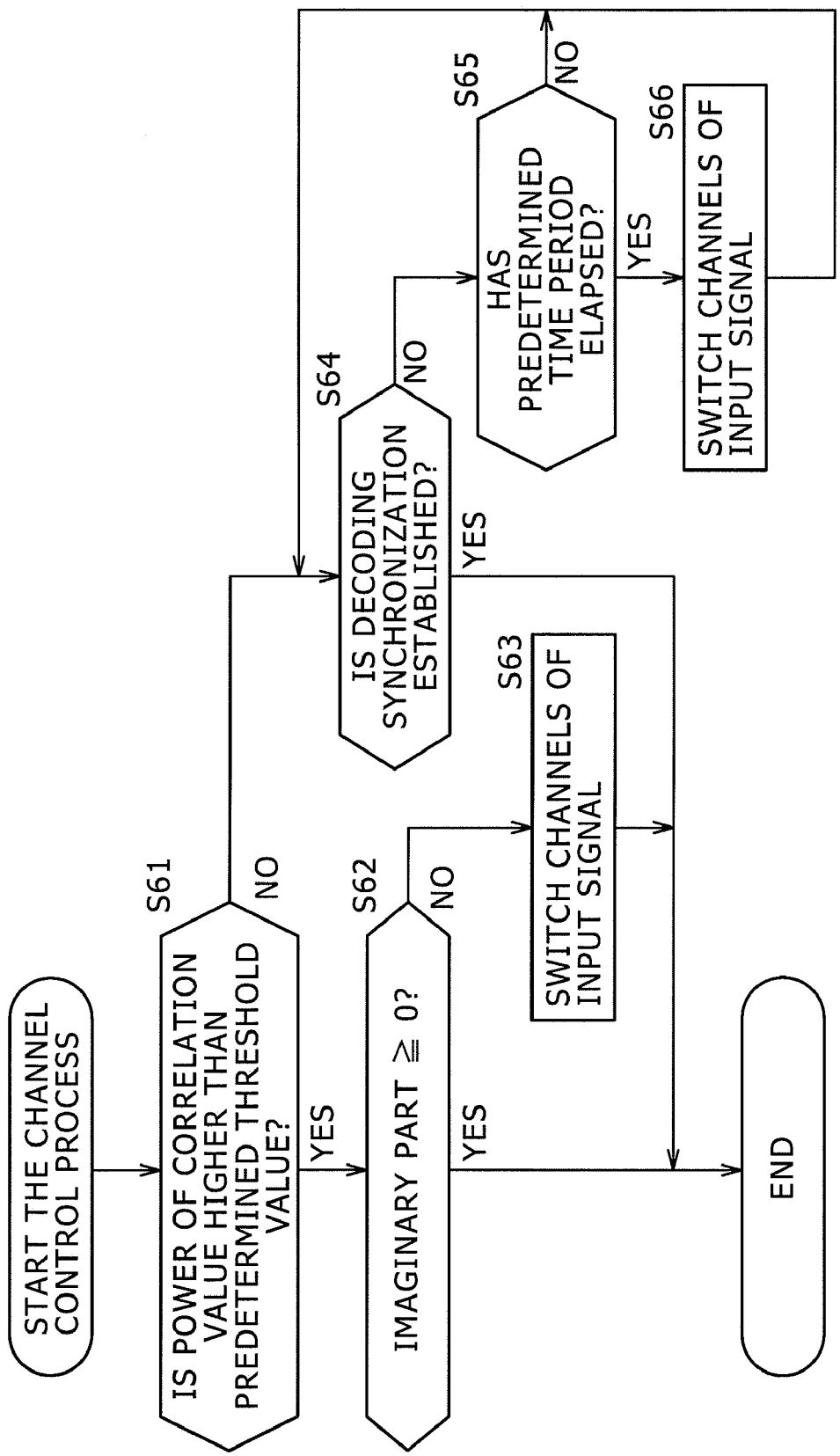
FIG. 22 is a flowchart explanatory of a third embodiment of the channel control process executed in relation to the frame synchronization process of FIG. 10.

Explained below in reference to the flowchart of FIG. 22 is how the third embodiment of the channel control process is executed by the channel control circuit 121 in relation to the frame synchronization process of FIG. 10.

In step S61, the confidence level determination section 131 determines whether the power of the correlation value is higher than a predetermined threshold value. The power of the correlation value becomes higher, the larger the absolute value of the correlation value becomes. Ideally, the correlation value at peak timing is $K^2$. Conversely, the higher the power of the correlation value, the larger the absolute value of the correlation value. That is, there appears a strong correlative relationship between the received delayed detection sequence and the known delayed detection sequence, which indicates a high confidence level of the correlation value. If the power of the correlation value is found to be higher than the predetermined threshold value, the confidence level determination section 131 notifies the channel control section 132 that the confidence level of the correlation value is sufficiently high. Control is then passed on to step S62.

The processing in steps S62 and S62 is similar to that in the above-described steps S21 and S22 in FIG. 19. The switching of the channels of the input signal is controlled based on the value of the imaginary part of the correlation value, before the channel control process is terminated.

Meanwhile, if in step S61 the power of the correlation value is found to be lower than the predetermined value, the confidence level determination section 131 notifies the channel control section 132 that the confidence level of the correlation value is low. Control is then passed on to step S64.

In step S64, the channel control section 132 determines whether decoding synchronization is established on the basis of the signal coming from the error correction and decoding circuit 124. If decoding synchronization is not found to be established, control is passed on to step S65.

In step S65, the channel control section 132 determines whether a predetermined time period has elapsed. If the predetermined time period is not found to have elapsed, i.e., if the state of decoding asynchronism is not found to have lasted for the predetermined time period, control is returned to step S64. Steps S64 and S65 are repeatedly executed until decoding synchronization is found to be established in step S64, or until the predetermined time period is found to have elapsed in step S65.

If in step S65 the predetermined time period is found to have elapsed, i.e., if the state of decoding asynchronism is found to have lasted for the predetermined time period, control is passed on to step S66.

In step S66, as in the above-described step S22 of FIG. 16, the channels of the input signal are switched. Thereafter, control is returned to step S64, and steps S64 through S66 are repeatedly executed until decoding synchronization is determined to be established in step S64. That is, the channels of the input signal are switched at predetermined intervals until decoding synchronization is established.

If in step S64 decoding synchronization is determined to be established, the channel control process is terminated.

As described, if the confidence level of the correlation value is determined to be high because of the high power of the correlation value, the third embodiment of the channel control process controls the switching of the channels of the input signal based on the correlation value. If the confidence level is determined to be low because of the low power of the correlation value, the third embodiment controls the switching of the channels of the input signal based on the status of the downstream decoding synchronization without using the correlation value. In this manner, the switching of the channels of the input signal can be controlled more accurately than before.

Alternatively, in steps S64 through S66, the same processing as that in steps S41 through S43 of FIG. 21 may be carried out. That is, the switching of the channels of the input signal may be controlled based on frame synchronization status.

Also, the confidence level of the correlation value may be determined based not on the power of the correlation value but directly on the magnitude of the correlation value.

Figure 23:
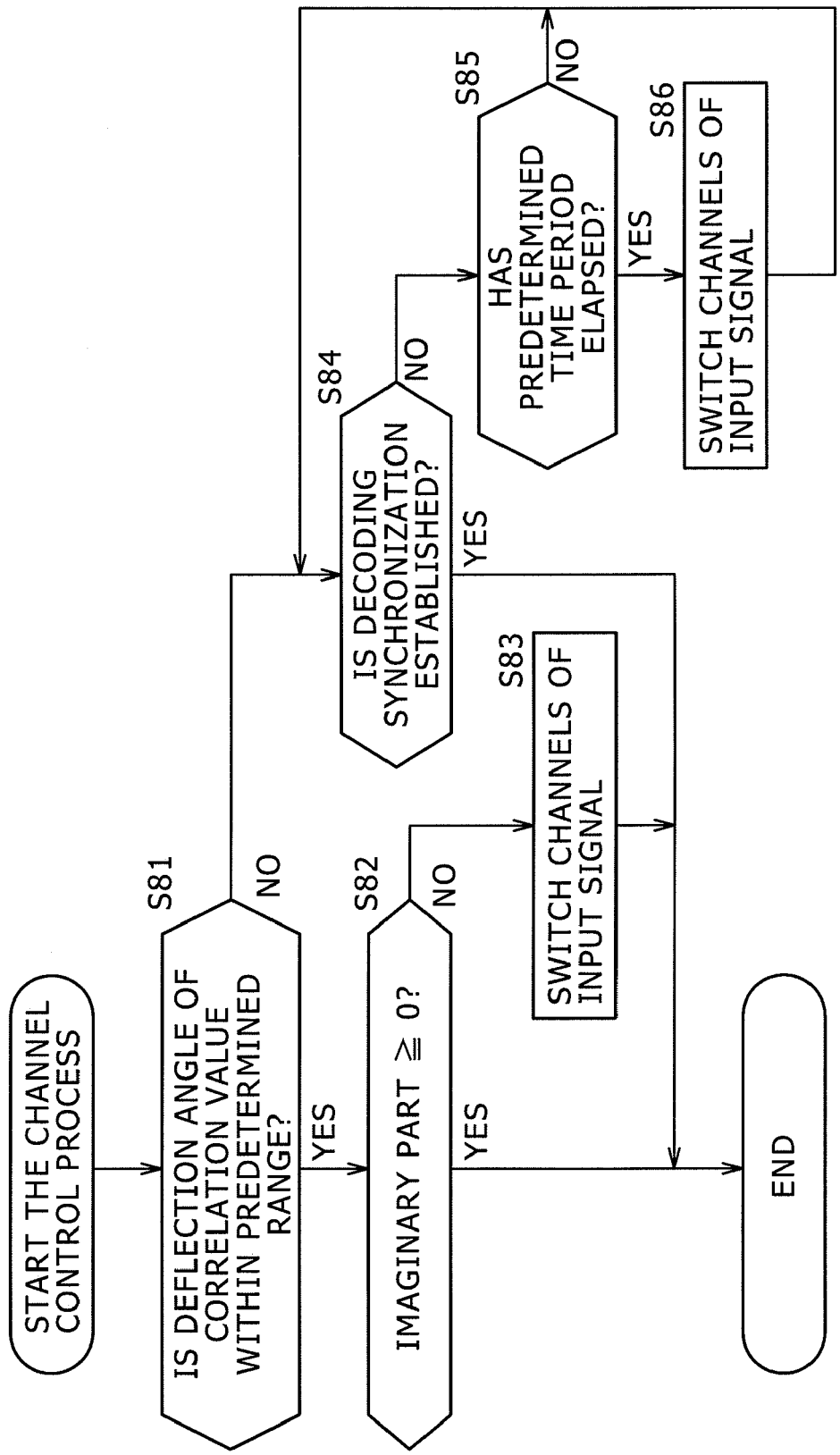
FIG. 23 is a flowchart explanatory of a fourth embodiment of the channel control process executed in relation to the frame synchronization process of FIG. 10.

Explained below in reference to the flowchart of FIG. 23 is how the fourth embodiment of the channel control process is executed by the channel control circuit 121 in relation to the frame synchronization process of FIG. 10.

The process in FIG. 23 is basically the same as that in FIG. 22, except for step S81 corresponding to step S61 of FIG. 22.

That is, in step S81, the confidence level determination section 131 determines whether the deflection angle of the correlation value falls within a predetermined range. More specifically, with the deflection angle of the correlation value expressed within the range of $-\pi$ to $\pi$, if the deflection angle of the correlation value meets the condition of the expression (4) below, i.e., if the deflection angle of the correlation value falls within the range shown shaded in FIG. 24, then the confidence level determination section 131 determines that the deflection angle of the correlation value falls within the predetermined range, and notifies the channel control section 132 that the confidence level of the correlation value is sufficiently high. Control is then passed on to step S82, and step S82 and subsequent steps are carried out.

$$\alpha \leq |\text{deflection angle of correlation value}| \leq \pi - \alpha \quad (4)$$

Specifically, if for example the value $\Delta\theta$ is small and varies little and if the deflection angle of the correlation value is close to $\pm\pi/2$, the confidence level of the correlation value is determined to be high. Then the switching of the channels of the input signal is controlled based on the value of the imaginary part of the correlation value.

Figure 24:
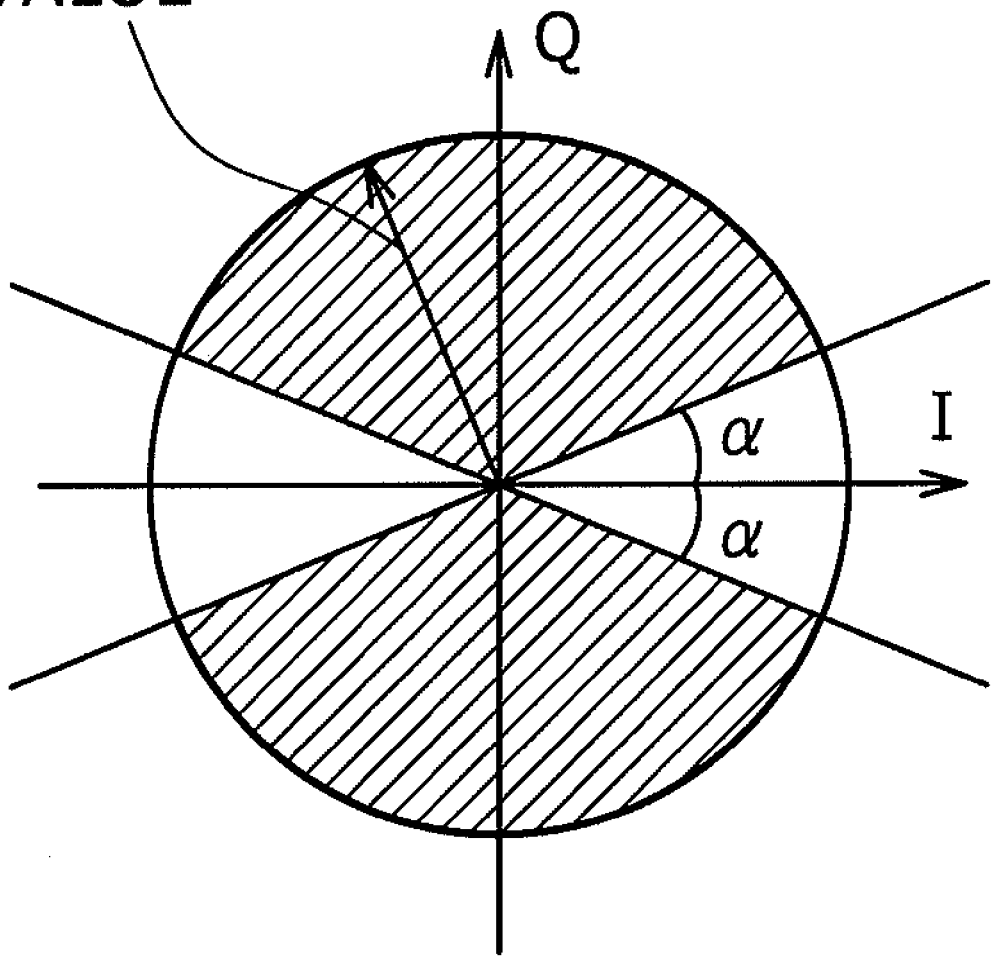
FIG. 24 is a view explanatory of a determination process in step S61 of FIG. 23.

If in step S81 the deflection angle of the correlation value does not meet the condition of the expression (4) below, i.e., if the deflection angle of the correlation value is out of the range shown shaded in FIG. 24, then the confidence level determination section 131 determines that the deflection angle of the correlation value is out of the predetermined range, and notifies the channel control section 132 that the confidence level of the correlation value is low. Control is then passed on to step S84, and step S84 and subsequent steps are carried out.

That is, when the deflection angle of the correlation value is close to zero or $\pi$ illustratively because the value $\Delta\theta$ is large or varies widely, the confidence level of the correlation value is determined to be low. The switching of the channels of the input channel is then controlled based on the result of the downstream decoding synchronization without using the correlation value. In this manner, the channels of the input signal can be switched more accurately than before.

Alternatively, in steps S84 through S86, the same processing as that in steps S41 through S43 of FIG. 21 may be carried out. That is, the switching of the channels of the input signal may be controlled based on frame synchronization status.

Figure 25:
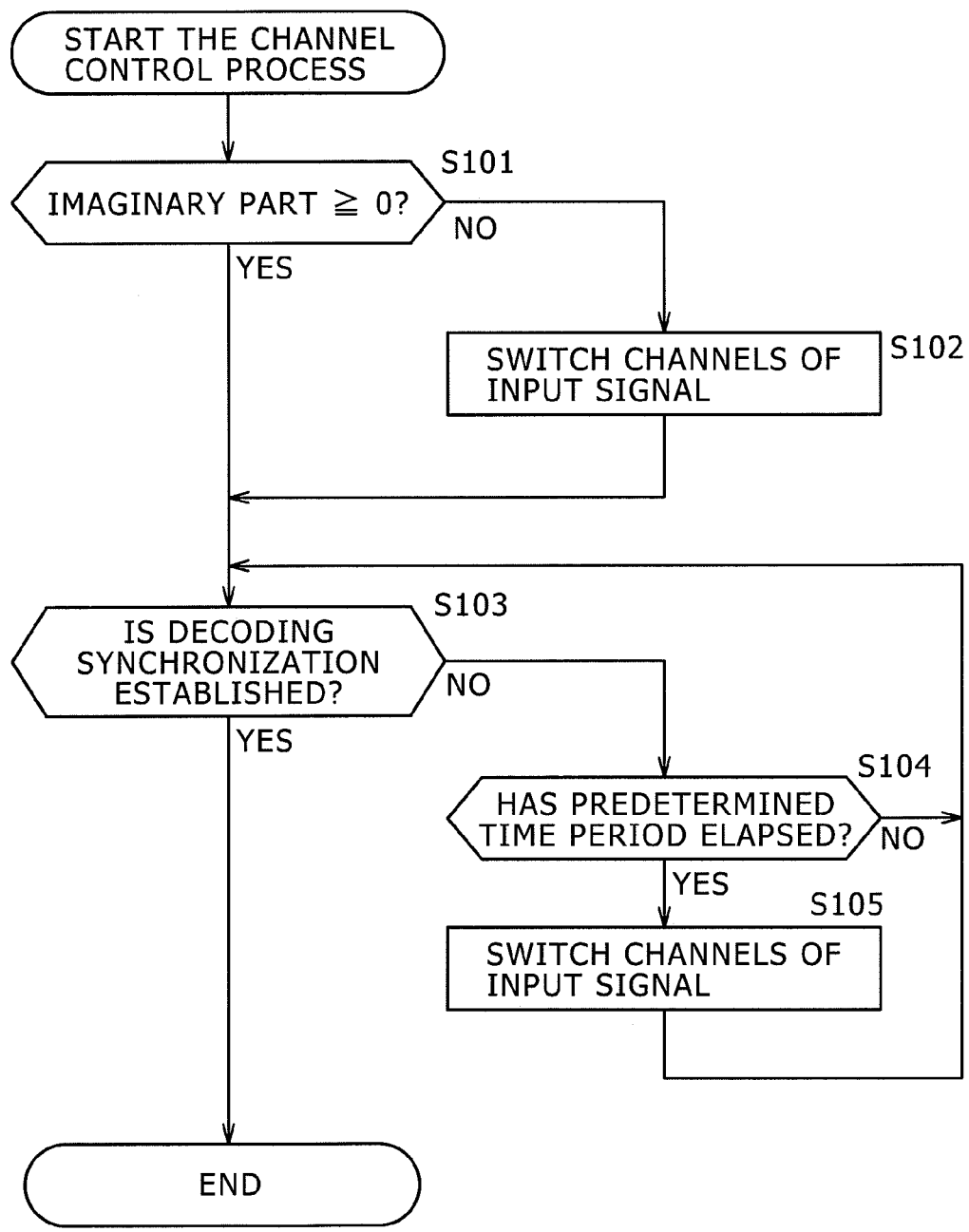
FIG. 25 is a flowchart explanatory of a fifth embodiment of the channel control process executed in relation to the frame synchronization process of FIG. 10.

Explained below in reference to the flowchart of FIG. 25 is how the fifth embodiment of the channel control process is executed by the channel control circuit 121 in relation to the frame synchronization process of FIG. 10.

In steps S101 and S102, the same processing as that in the above-described steps S21 and S22 of FIG. 19 is carried out. That is, the switching of the channels of the input signal is controlled based on the value of the imaginary part of the correlation value.

Thereafter, in steps S103 through S105, the same processing as that in the above-described steps S64 through S66 of FIG. 22 is carried out. That is, the switching of the channels of the input signal is controlled based on the result of the downstream decoding synchronization.

The steps above make it possible to restore the initial channels of the input signal after the channels of the input signal were erroneously switched because the value $\Delta\theta$ was found out of the range of $\pm\pi/2$ or because the value of the imaginary part of the correlation value was used as the basis for the switching with the confidence level of the correlation value found to be low. The channels of the input signal can thus be switched more accurately than before.

Alternatively, in steps S103 through S105, the same processing as that in steps S41 through S43 of FIG. 21 may be carried out. That is, the switching of the channels of the input signal may be controlled based on frame synchronization status.

The methods for calculating the correlation value are not limited to those discussed above. Other methods may be adopted if they are capable of calculating the correlation value expressive of the direction and magnitude of the correlation between the received delayed detection sequence and the known delayed detection sequence.

The foregoing description has shown examples in which the correlation values corresponding to the respective delayed detection values are added up for use in determining whether or not to switch the channels of the input signal. Alternatively, the mean value of the correlation values corresponding to the respective delayed detection values may illustratively be used for the determination.

Furthermore, it is also possible to determine whether the channels of the input signal are being inverted based on the value of the imaginary part of the correlation value between the known delayed detection sequence and the received delayed detection sequence corresponding to the known sequence, even if the correlation value between the known delayed detection sequence and the received delayed detection sequence corresponding to the known sequence does not necessarily become a peak value notably because of the effects of noise or frequency error.

The present invention may be applied illustratively to a demodulating apparatus for demodulating signals modulated according to the DVB-S.2 standard, and to an apparatus that incorporates such a demodulating apparatus (e.g., satellite broadcast receiving apparatus).

Also, the present invention may be applied to a demodulating apparatus for demodulating the input signal that is modulated according to standards other than the DVB-S.2 standard in such a manner that the correlative relationship between the known sequence and the received sequence differs distinctly between the case in which the channels of the input signal are not inverted and the case in which the channels of the input signals are inverted, the present invention being further applicable to an apparatus that incorporates such a demodulating apparatus.

The series of the steps and processes described above may be executed by hardware or by software. Where the software-based processing is to be carried out, the programs constituting the software may be either incorporated beforehand in the dedicated hardware of a computer for program execution, or installed from a suitable program recording medium into a general-purpose personal computer or like equipment capable of executing diverse functions based on the installed programs.

FIG. 26 is a block diagram showing a typical hardware structure of a computer for executing the above-described series of steps and processes using programs.

In the computer, a CPU (Central Processing Unit) 201, a ROM (Read Only Memory) 202, and a RAM (Random Access Memory) 203 are interconnected by a bus 204.

An input/output interface 205 is further connected to the bus 204. The input/output interface 205 is connected to an input section 206 made up of a keyboard, a mouse, a microphone, etc.; an output section 207 formed by a display, speakers, etc.; a storage section 208 composed of a hard disk, a nonvolatile memory, etc.; a communication section 209 constituted by a network interface, etc.; and a drive 210 that drives removable media 211 such as a magnetic disk, an optical disk, a magneto-optical disk, or a semiconductor memory.

In the computer structured as described above, the CPU 201 loads programs illustratively from the storage section 208 into the RAM 203 for execution via the input/output interface 205 and bus 204, thereby carrying out the above-described series of steps and processes.

Illustratively, the programs to be executed by the computer (CPU 201) are offered either recorded on the removable media 211 constituting package media such as magnetic disks (including flexible disks), optical disks (CD-ROM (Compact Disc-Read Only Memory), DVD (Digital Versatile Disc), etc.), magneto-optical disks, or semiconductor memories; or distributed through wired or wireless transmission media such as local area networks, the Internet, or digital satellite broadcasts.

And the programs may be installed into the storage section 208 via the input/output interface 205 when the removable media 211 are attached to the drive 210. The programs may also be installed into the storage section 208 after being received by the communication section 209 via the wired or wireless transmission media. Alternatively, the programs may be preinstalled in the ROM 202 or storage section 208.

Also, the programs for execution by the computer may be processed in the depicted sequence of this description on a time series basis, in parallel, or in otherwise appropriately timed fashion such as when they are invoked.

In this description, the term "system" refers to an entire apparatus made up of a plurality of component devices.

It should be understood that the present invention when embodied is not limited to the above-described embodiments and that various modifications, variations and alternatives may be made of the invention so far as they are within the scope of the appended claims or the equivalents thereof.

The invention claimed is:

1. A demodulating apparatus for demodulating an input signal split into an in phase (I)-channel signal and an orthogonal(Q)-channel signal, said demodulating apparatus comprising:

correlation detection means for calculating a correlation value between a known sequence made of symbols of known values inserted in said input signal and a received sequence formed by the symbols obtained by detecting said input signal, and channel control means for switching the channels of said input signal if the correlation between said known sequence and said received sequence corresponding to said known sequence is found to be a negative correlation.

2. The demodulating apparatus according to claim 1, wherein, if frame synchronization of said input signal is not established within a predetermined time period after the channels of said input signal have been switched, then said channel control means again switches the channels of said input signal.

3. The demodulating apparatus according to claim 1, further comprising:
confidence level determination means for determining the confidence level of said correlation value based on the magnitude of said correlation value;
wherein, if the confidence level of said correlation value is not determined to be sufficient, then said channel control means switches said channels on the basis of the result of decoding synchronization of said input signal.

4. The demodulating apparatus according to claim 1, wherein said known sequence is modulated through π/2 shift BPSK (Binary Phase Shift Keying) when inserted into said input signal.

5. The demodulating apparatus according to claim 4, further comprising:
confidence level determination means for determining the confidence level of said correlation value based on the magnitude of a deflection angle of said correlation value;
wherein, it the confidence level of said correlation value is not determined to be sufficient, then said channel control means switches said channels on the basis of the result of decoding synchronization of said input signal.

6. A demodulating method for use with a demodulating apparatus for demodulating an input signal split into an in-phase (I)-channel signal and an orthogonal (Q)-channel signal, said demodulating method comprising the steps of:
calculating, by a processor, a correlation value between a known sequence made of symbols of known values inserted in said input signal and a received sequence formed by the symbols obtained by detecting, said input signal; and
switching the channels of said input signal if the correlation between said known sequence and said received sequence corresponding to said known sequence is found to be a negative correlation.

* * * * *